United States Patent [19]
Striegl

[11] 3,842,697
[45] Oct. 22, 1974

[54] APPARATUS FOR TURNING WORKPIECES

[76] Inventor: Georg Striegl, Liststrasse 29, Reutlingen, Germany

[22] Filed: Mar. 1, 1973

[21] Appl. No.: 336,905

[30] Foreign Application Priority Data
Mar. 11, 1972 Germany.......................... 2211900

[52] U.S. Cl. .................................... 82/2 E, 82/20
[51] Int. Cl.............................................. B23b 5/12
[58] Field of Search ............................... 82/2 E, 20

[56] References Cited
UNITED STATES PATENTS
| | | | |
|---|---|---|---|
| 2,383,050 | 8/1945 | Esson | 82/2 E |
| 2,619,174 | 11/1952 | Neale | 82/2 E |
| 2,814,964 | 12/1957 | Werth | 82/20 |

FOREIGN PATENTS OR APPLICATIONS
| | | | |
|---|---|---|---|
| 1,031,218 | 6/1966 | Great Britain | 82/20 |
| 1,208,643 | 10/1970 | Great Britain | 82/20 |

*Primary Examiner*—Leonidas Vlachos
*Attorney, Agent, or Firm*—W. G. Fasse; W. W. Roberts

[57] ABSTRACT

The present apparatus for turning workpieces includes a tool carrier head in which the tools are carried by head supported slides. The displacement of the slides in unison is accomplished by a feed advance tube, the axial movement of which is transmitted to the slides by intermediate connecting means which have the shape substantially of triangles, the corners of which are provided with linking means for movable linking the connecting triangles to the feed advance tube as well as to the slides and to the tool carrier head, whereby the triangles are permitted to pivot about a travelling pivot point.

7 Claims, 2 Drawing Figures

APPARATUS FOR TURNING WORKPIECES

BACKGROUND OF THE INVENTION

The invention relates to an apparatus for turning workpieces with a rotating tool carrier head for internal and external turning of stationary workpieces. The tool carrier head supports tool slides which are advanced from the outside during the rotation of the tool carrier head. The tool slides are arranged opposite each other. The feed advance of the tool slides may, for example be accomplished by hydromechanical means and the feed advance may be controlled by copying or duplicating controls for example a template control means.

Various devices of the just described type are known in the art. These devices may be generally placed into two groups. The first group comprises machines which do not have an axially extending free passage so that only short workpieces may be machined depending on the extent to which the tools proper project in front of the facing surface of the machine.

The second group comprises all those machines which have an axially extending free passage so that longer workpieces may be machined depending on the free turning length of the workpiece and also upon the inner free diameter of said passage. For example, prior art peeling devices belong to this group. These peeling devices comprise a tool carrier head having said free passage. A tube which turns together with the tool carrier head extends into the free passage. The tube carries at its front end a ring which in its radial section has a conical shape. The ring includes a conical portion or member which constitutes a bearing support for double arm levers which are supported in the tool carrier head by means of rollers and the free ends of which cooperate with the tool slides, for the feed advance of these slides. The slides are advanced when the tube is pressed into the tool carrier head. This type of arrangement has the disadvantage that it does not permit to achieve large displacements or strokes of the tool slides.

Still another prior art machine of the above described type comprises a tool carrier head with a free passage. A feed advance tube extends through said free passage but does not rotate with the tool carrier head. The feed advance tube is advanced hydraulically. A ring is supported at the front end of the tube inside the tool carrier head and the ring runs on ball bearings. Short racks are supported in the ring and cooperate with pinions for advancing the tool slides, whereby the rear surface of these tool slides is provided with a rack which meshes with said pinion. For a given tool carrier head diameter and for a given still useful free passage through the head there does not remain much space for the just described actuating mechanism of the slides. In other words, large strokes or displacements of the tool slides are not possible. Such small displacements of the slides in this type of apparatus having a predetermined outer and inner diameter are thus rather disadvantageous for a universal application or use of the apparatus.

The relatively small displacements of the tool slides in the just described devices are due to the fact that the intermediate member, for example, in the form of a lever or a pinion requires a fixed pivot point. These intermediate members are necessary for transmitting the feed advance movement from the tube to the slides, whereby the centrally located tube is axially movable for the displacement of said tool slides.

OBJECTS OF THE INVENTION

In view of the foregoing it is the aim of the invention to achieve the following objects singly or in combination:

to remove the drawbacks of the prior art, more specifically to increase the displacement or stroke of the tool slides without increasing the outer and inner diameter of the tool carrier head; and to provide an intermediate connecting means or member for transmitting the feed advance movement of the tube to the tool slides, which member is of simple construction and arranged in such a manner that the pivot point may move along as the displacement of the tool slides takes place.

SUMMARY OF THE INVENTION

According to the invention there are provided intermediate connecting members between the tool slides and the feed advance tube which are guided in such a manner in the tool carrier head that their pivot point is movable, whereby the shape of the intermediate member or members depends upon the relative angular position of the tool slide relative to the rotational axis of the tool carrier head. Thus, said angular position may, for instance, include an angle of 60° between the longitudinal axis of each slide and the rotational axis. Another advantageous angular position would, for example, include an angle of 90°.

According to the invention there are provided linking means between the intermediate connecting members on the one hand, and the slides, the feed advance tube, and the tool carrier head on the other hand. Preferably, these linking means comprise journal means between the slides and the intermediate connecting member and guide grooves in the tool carrier head and on the feed advance tube as well as guide blocks or rollers on the intermediate connecting member which blocks or rollers ride in said grooves.

BRIEF FIGURE DESCRIPTION

In order that the invention may be clearly understood, it will now be described, by way of example, with reference to the accompanying drawings, wherein:

FIG. 1 is a longitudinal axial section through the tool carrier head according to the invention; and FIG. 2 illustrates a partial sectional view along the line I—I in FIG. 1, whereby for simplicity's sake all carrier head portions surrounding the intermediate members have been omitted.

DETAILED DESCRIPTION OF EXAMPLE EMBODIMENTS

Figures 1, 2:
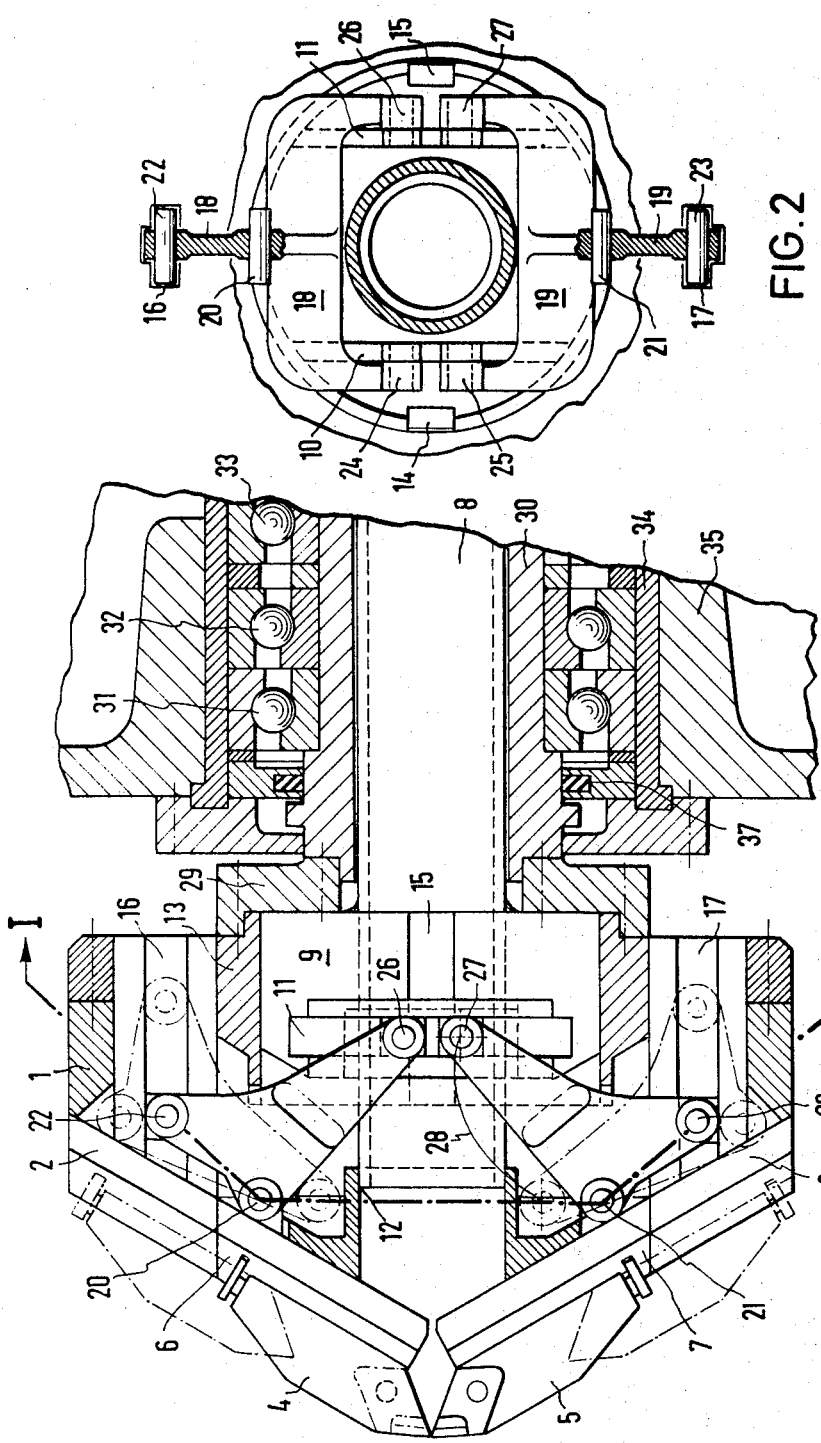

The tool carrier head 1 shown in FIG. 1 comprises at its front face guide grooves 2 and 3 in which the adjustable tool slides 6 and 7 are arranged. Tools 4 and 5 are attached to the respective slides 6 and 7. A central bore extends axially and centrally through the tool carrier head 1. A feed advance tube 8 is arranged inside said bore. The feed advance tube 8 rotates with the head 1 and the feed advance itself may for example be accomplished by hydraulic means not shown. The feed advance tube 8 is provided with a guide ring 9 which in turn is provided with guide grooves 10 and 11. These guide grooves 10 and 11 extend in a plane which in turn extends perpendicularly relative to the rotational axis of the tool carrier head. FIG. 2 illustrates the position of the guide grooves 10 and 11. The guide ring 9 and the feed advance tube 8 are rigidly connected to each other, for example, by weldments not shown. The feed advance tube 8 is further guided at its front end in the bore 12 of the head 1. The guide ring 9 is supported in a further ring 13 and tongue and groove means 14 and 15 between the rings 9 and 13 prevent a relative rotation between these rings.

The tool carrier head 1 is further provided with guide grooves 16 and 17 which receive guide blocks or rollers journaled to intermediate connecting members 18 and 19 provided according to the invention. These guide blocks or guide rollers are attached to the intermediate members by means of studs extending perpendicularly through the connecting members at the respective corners 22 and 23 thereof. These intermediate connecting members 18 and 19 serve for displacing the tool slides 6 and 7 with their respective tools 4 and 5 in unison and by equal displacements in response to the feed advance movement of the feed advance tube 8. In the shown example the tool slides 6 and 7 have a longitudinal axis which includes an angle of 60° with the rotational longitudinal axis of the tool carrier head. According to the invention the intermediate connecting members 18 and 19 have an approximately triangular shape as viewed from the side thereof and relative to their pivoting points 20, 22 and 26 or 21, 23 and 27 respectively. In the illustrated example, the triangular shape corresponds to one half of an equilateral triangle. Stated differently, the triangle is a rectangular triangle with the rectangle located at the pivot point 20 and having legs which relate to each other and to the hypotenuse as 1 : $\sqrt{3}$ : 2. Furthermore, these intermediate members 18 and 19 have forked legs extending away from the pivot point 20 and 21 respectively and toward the guide ring 9, whereby the ends of these forked legs are guided in the above mentioned guide grooves 10 and 11 of the guide ring 9.

The intermediate connecting members 18 and 19 are journaled at their corner points 20 and 21 to the tool slides 6 and 7, whereby a pivotal movement is permitted between the connecting members 18 and 19 and the respective tool slide. The corner points 22 and 23 of the triangular connecting members 18 and 19 are provided with guide blocks or guide rollers which ride in guide grooves 16 and 17 respectively. The latter guide grooves are provided inside the tool carrier head 1 as best seen in FIG. 1. The end points 24 and 26 of the forked legs of the connecting member 18 ride preferably also through guide blocks or guide rollers in the guide grooves 10 and 11 of the ring 9 as mentioned above. The same applies with regard to the end points 25 and 27 of the connecting member 19.

In order to more clearly illustrate the motion of the intermediate connecting members 18 and 19 in response to the feed advance of the tube 8, these intermediate connecting members 18 and 19 and the slides 6 and 7 with their tools 4 and 5 are shown by dash-dotted lines in their end position. Thus, for example, the movement of the end point 27 of the intermediate member 19 is a curve 28. By an analytical consideration of the movement of the connecting members 18 and 19 it may be shown that the motion of the feed advance tube 8 imparts equal length displacements to the tool slides 6 and 7.

The tool carrier head 1 is secured to the intermediate flange 29 which in turn is secured to the spindle 30. The spindle 30 is rotatably supported in the head stock 35 by means of thrust bearings 31, 32 and 33 arranged in a bushing 34. Sealing rings such as shown at 37 prevent the entrance of dust or dirt as well as the exit of oil from the bearings. The bearing box is closed by a cover member 38.

Although the foregoing example has been described with reference to an angle of 60° formed between the tool slides 6 and 7 and the rotational axis of the tool carrier head, it will be appreciated that any other angle may be accommodated by the present invention provided that the journal or pivot points of the intermediate connecting members 18 and 19 form a respectively differently formed triangle. For example, if the tool slides should extend perpendicularly relative to the rotational axis of the tool carrier head, the pivot points of the intermediate members 18 and 19 would form a rectangular triangle having legs of equal length, whereby the legs would relate to each other and to the hypotenuse as 1:1: $\sqrt{2}$.

Although the invention has been described with reference to specific example embodiments, it will be appreciated, that it is intended to cover all modifications and equivalents within the scope of the appended claims.

I claim:

1. In an apparatus for turning workpieces by means of tools secured to tool slides movably supported in a tool carrier head at an angle relative to the rotational axis of the tool carrier head, said tool slides being arranged opposite each other, and wherein a feed advance tube for said tool slides reaches into said tool carrier head, the improvement comprising intermediate connecting means, guide means for movably locating the intermediate connecting means between said tool slides and the feed advance tube, and linking means operatively interposed between said slide means, said guide means, said feed advance tube and said intermediate connecting means for transmitting equal displacements from said feed advance tube to all tool slides, wherein said linking means between the intermediate connecting means and the guide means comprise studs extending from said intermediate connecting means, and guide blocks or rollers on said studs, said guide means comprising guide grooves in said tool carrier head extending in parallel to said rotational axis of said tool carrier head, said guide blocks or rollers riding in said guide grooves.

2. The apparatus according to claim 1, wherein each of said tool slides has a longitudinal axis which includes with said rotational axis an angle of 60°, and wherein said intermediate connecting means have a shape relative to said linking means, which shape corresponds to one half of an equilateral triangle whereby the sides of the triangle relate to each other and to the hypotenuse as 1 to $\sqrt{3}$ to 2.

3. The apparatus according to claim 1, wherein said guide means for said intermediate connecting means permit the movement of said intermediate connecting means about a travelling pivot point.

4. The apparatus according to claim 1, wherein each of said intermediate connecting means comprise forked legs extending toward said feed advance tube.

5. The apparatus according to claim 1, wherein said linking means comprise journal means for pivoting said intermediate connecting means to said slide means.

6. The apparatus according to claim 1, wherein said intermediate connecting means comprise forked legs extending toward said feed advance tube, said linking means comprising further studs extending from said forked legs, and further guide blocks or rollers on said further studs, said guide means also comprising a guide ring surrounding said feed advance tube and further guide grooves in said guide ring, said further guide grooves extending in a plane which in turn extends perpendicularly to said rotational axis of the tool carrier head, said further guide blocks or rollers riding in said further guide grooves of said guide ring.

7. The apparatus according to claim 1, wherein each of the tool carrier slides has a longitudinal axis which includes with said rotational axis an angle of 90°, and wherein said intermediate connecting means have a shape relative to said linking means, which shape corresponds to a rectangular triangle with equal legs whereby the legs of the triangle relate to each other and to the hypotneuse as 1 to 1 to $\sqrt{2}$.

* * * * *